US011679682B2

(12) United States Patent
Ishii

(10) Patent No.: US 11,679,682 B2
(45) Date of Patent: Jun. 20, 2023

(54) HAULAGE VEHICLE

(71) Applicant: HITACHI CONSTRUCTION MACHINERY CO., LTD., Tokyo (JP)

(72) Inventor: Akinori Ishii, Ushiku (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 601 days.

(21) Appl. No.: 16/642,906

(22) PCT Filed: Sep. 18, 2018

(86) PCT No.: PCT/JP2018/034406
§ 371 (c)(1),
(2) Date: Feb. 28, 2020

(87) PCT Pub. No.: WO2020/059009
PCT Pub. Date: Mar. 26, 2020

(65) Prior Publication Data
US 2021/0039503 A1 Feb. 11, 2021

(51) Int. Cl.
*B60L 15/20* (2006.01)
*B60K 23/00* (2006.01)
(Continued)

(52) U.S. Cl.
CPC ............ *B60L 15/20* (2013.01); *B60K 23/00* (2013.01); *B60K 31/00* (2013.01); *B60P 1/04* (2013.01);
(Continued)

(58) Field of Classification Search
CPC .. B60L 15/20; B60L 2200/40; B60L 2200/36; B60K 23/00; B60K 31/00;
(Continued)

(56) References Cited

U.S. PATENT DOCUMENTS 5,002,340 A * 3/1991 Loggins ................... B60P 1/04
414/513
2014/0159466 A1* 6/2014 Minoshima ............ B60P 1/283
298/22 C
(Continued)

FOREIGN PATENT DOCUMENTS

JP 2005043267 A * 2/2005
JP 2005043267 A 2/2005
(Continued)

OTHER PUBLICATIONS

English translation of Watanabe (JP 2005043267) (Year: 2005).*

Primary Examiner — James M McPherson
Assistant Examiner — Kyle J Kingsland
(74) Attorney, Agent, or Firm — Mattingly & Malur, PC

(57) ABSTRACT

A haulage vehicle includes a body, a load measurement device that measures a mounted load value of the body, a traveling electric motor, and a travel control device that outputs an electric motor command value, the travel control device sets a backward movement limiting set value to ON when it is determined that the haulage vehicle is in execution of either loading work or dumping work, and sets the backward movement limiting set value to OFF when a forward position signal and an accelerator pedal command value are inputted, an electric motor command value formed of a backward movement limiting command value is outputted to the traveling electric motor when the backward movement limiting set value is ON, and an electric motor command value formed of a normal command value is outputted to the traveling electric motor when the backward movement limiting set value is OFF.

4 Claims, 10 Drawing Sheets

(51) Int. Cl.
  *B60K 31/00* (2006.01)
  *B60P 1/04* (2006.01)
(52) U.S. Cl.
  CPC ... *B60K 2031/0091* (2013.01); *B60L 2200/40* (2013.01); *B60Y 2300/60* (2013.01)
(58) Field of Classification Search
  CPC .............. B60K 2031/0091; B60P 1/04; B60Y 2300/60; B60W 2300/12
  See application file for complete search history.

(56) References Cited

U.S. PATENT DOCUMENTS

2015/0355333 A1* 12/2015 Ono ..................... G01S 7/4972
    356/4.01
2017/0044736 A1   2/2017 Miyamoto et al.

FOREIGN PATENT DOCUMENTS

| | | |
|---|---|---|
| JP | 2008126940 A | 6/2008 |
| JP | 2012116269 A | 6/2012 |
| JP | 2013141946 A | 7/2013 |
| JP | 2013224117 A | 10/2013 |
| JP | 2016022804 A | 2/2016 |

* cited by examiner

HAULAGE VEHICLE

TECHNICAL FIELD

The present invention relates to a haulage vehicle, and relates specifically to travel control suitable to a haulage vehicle for a mine.

BACKGROUND ART

In a mining site of a mine, a dump truck that is a kind of the haulage vehicle assumes a role of transporting dirt and ore from a loading spot to a dumping spot. In the loading spot, the haulage vehicle approaches toward an excavation bench by forward movement or backward movement, an excavation machine working at the excavation bench, and stops at the loading spot. Also, after completion of loading by the excavation machine, the haulage vehicle moves forward and moves toward a transportation road.

Further, in the dumping spot, when the dirt is mounted for example, the haulage vehicle enters a dirt reclamation area, thereafter moves backward toward and approaches the dumping spot, and stops. Then the haulage vehicle tilts a vessel of the haulage vehicle rearward and dumps the mounted dirt rearward. At this time, when the dumped dirt piles up on the ground surface and does not thoroughly drop from the vessel, the haulage vehicle moves forward while keeping the vessel to be raised, and dumps the entire load mounted within the vessel. Also, after dumping the dirt entirely, the haulage vehicle causes the vessel to fall, moves forward, and moves toward the transportation road.

That is to say, in both of the loading work and the dumping work, a work procedure of moving forward to withdraw from a working spot is common. Here, when an operator of the haulage vehicle erroneously moves the haulage vehicle backward by carelessness after the loading or dumping work, the haulage vehicle possibly collides on the excavation bench and the dumped dirt. As a result, there is a risk that the haulage vehicle is damaged.

As a technology for preventing such vehicle starting accident as described above, in Patent Literature 1, there is a description that "An in-stop travelling direction determination section determines travelling/reversing (in-stop travelling direction) when a vehicle is stopped, and an in-stop travelling direction storage section stores its result of determination. On the other hand, an in-start travelling direction determination section determines travelling/reversing (in-start travelling direction) when the vehicle is started, and compares the in-start travelling direction with the in-stop travelling direction stored in the in-stop travelling direction storage section. When both directions are matched with each other, it is determined that the in-start travelling direction is not safe. In this case, an alarm section gives an alarm to such effect, and a vehicle control section executes control of prohibiting travelling of the vehicle to prevent any accident in advance (excerption of Abstract)."

CITATION LIST

Patent Literature

PATENT LITERATURE 1: JP-A No. 2008-126940

SUMMARY OF INVENTION

Technical Problem

According to the travel control process described in Patent Literature 1, the working state of the vehicle is not recognized, and limiting control is executed using information of the moving direction immediately before stop of the vehicle and the moving direction after stop of the vehicle when the vehicle stops. Therefore, for example, when the haulage vehicle starts by travelling after the haulage vehicle stops at the loading spot by travelling, or when the haulage vehicle tries to move backward again for positional adjustment after temporary stop while approaching the loading spot or the dumping spot by backward movement, since the haulage vehicle moves in a same direction before/after stop of the vehicle, travel limiting control comes to work. Therefore, when the technology of Patent Literature 1 is applied to a haulage vehicle for a mine, deterioration of operability is worried about.

The present invention has been achieved in view of the problem described above, and its object is to provide a technology that is suitable to a haulage vehicle particularly for a mine and suppresses erroneous starting when a vehicle starts.

Solution to Problem

In order to solve the problem described above, the present invention is a haulage vehicle including a vehicle frame, a body that mounts a load, a load measurement device that measures a mounted load value of the body, a traveling electric motor, a shift lever that shifts the travel direction forward or backward, an accelerator pedal, and a travel control device that outputs an electric motor command value to the traveling electric motor, wherein the travel control device is connected to each of the load measurement device, the traveling electric motor, the shift lever, and the accelerator pedal, a backward movement limiting set value that limits backward traveling of the haulage vehicle is set to ON when it is determined that the haulage vehicle is in execution of either loading work or dumping work based on variation in a mounted load value calculated by the load measurement device, it is determined that the haulage vehicle has moved forward when a forward position signal and an accelerator pedal command value are inputted and the backward movement limiting set value is set to OFF, the forward position signal showing that the shift lever is set to a forward position, the accelerator pedal command value being generated accompanying stepping down of the accelerator pedal, an electric motor command value formed of a backward movement limiting command value that limits backward movement of the haulage vehicle is outputted to the traveling electric motor when the backward movement limiting set value is ON, and an electric motor command value formed of a normal command value not applying backward movement limitation is outputted to the traveling electric motor when the backward movement limiting set value is OFF.

Advantageous Effects of Invention

According to the present invention, it is allowed to provide a technology that is suitable to a haulage vehicle particularly for a mine and suppresses erroneous starting when a vehicle starts. Problems, configurations, and effects other than those described above will be clarified by explanation of embodiments hereinafter described.

DESCRIPTION OF EMBODIMENT

An embodiment of the present invention will be hereinafter explained using the drawings. In all drawings, same configurations are marked with a same reference sign, and duplicated explanation thereof will be omitted.

In the explanations below, a dump truck will be used as a haulage vehicle 1. Hereinafter, "left" is the left side in viewing the front from a cab 2 of the dump truck, and "right" becomes the right side in viewing the front from the cab 2.

<Mine Site>

Figure 1:
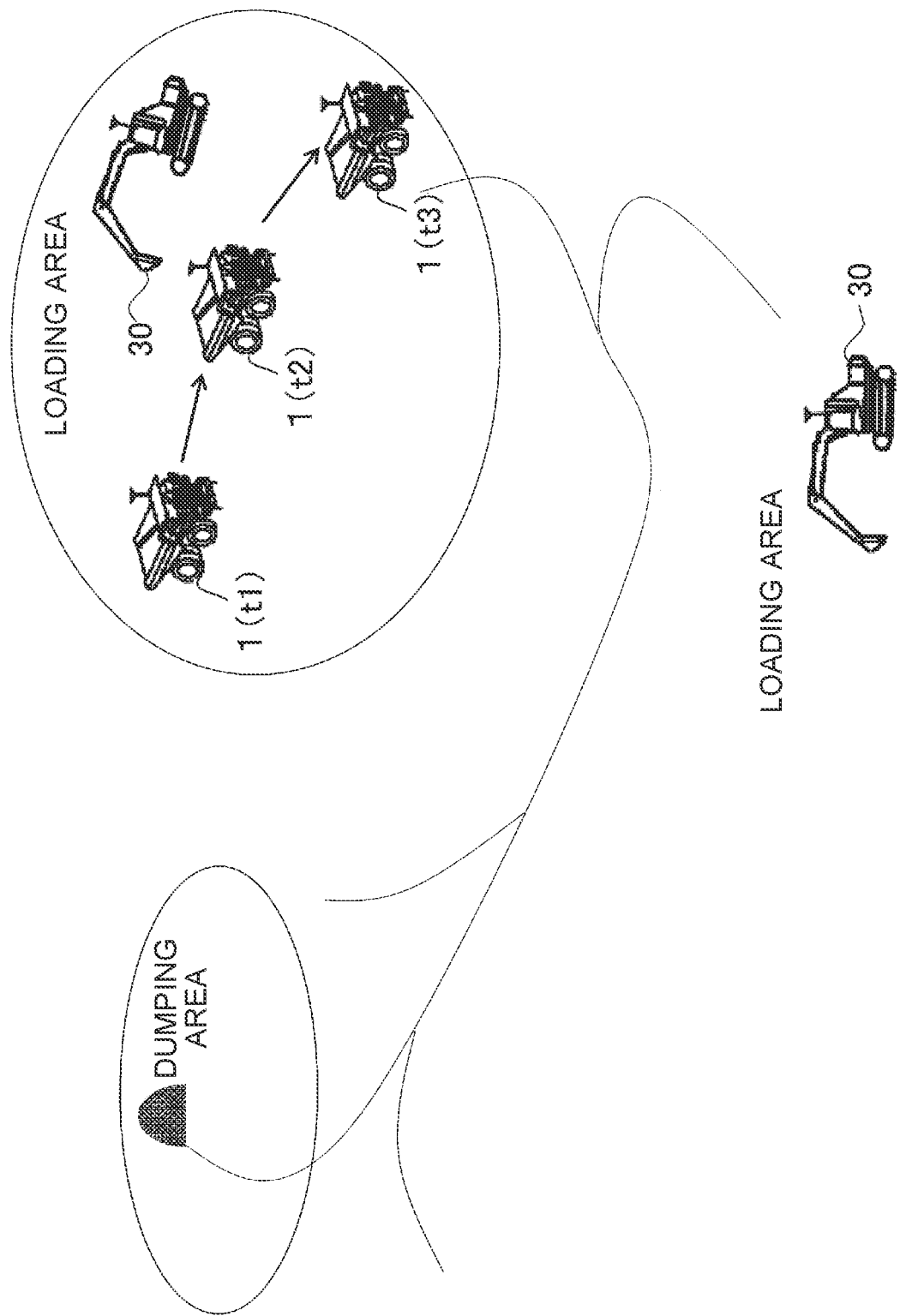
FIG. 1 is a drawing that shows a schematic configuration of a mine site in the present embodiment.

FIG. 1 is a drawing that shows a schematic configuration of a mine site in the present embodiment. As shown in FIG. 1, in a mine site, there are operated at least one loading machine 30 that executes excavation work, loading work, and the like, and at least one haulage vehicle 1 that transports a load such as the crushed stone and dirt excavated by the loading machine 30 from a loading area to a dumping area.

The haulage vehicle 1 moves forward toward the loading machine 30 at a time point t1, and stops at a loading spot at a time point t2. The haulage vehicle 1 may move forward toward the dumping area at a time point t3 when the loading work is completed.

<Configuration of Haulage Vehicle>

Figure 2:
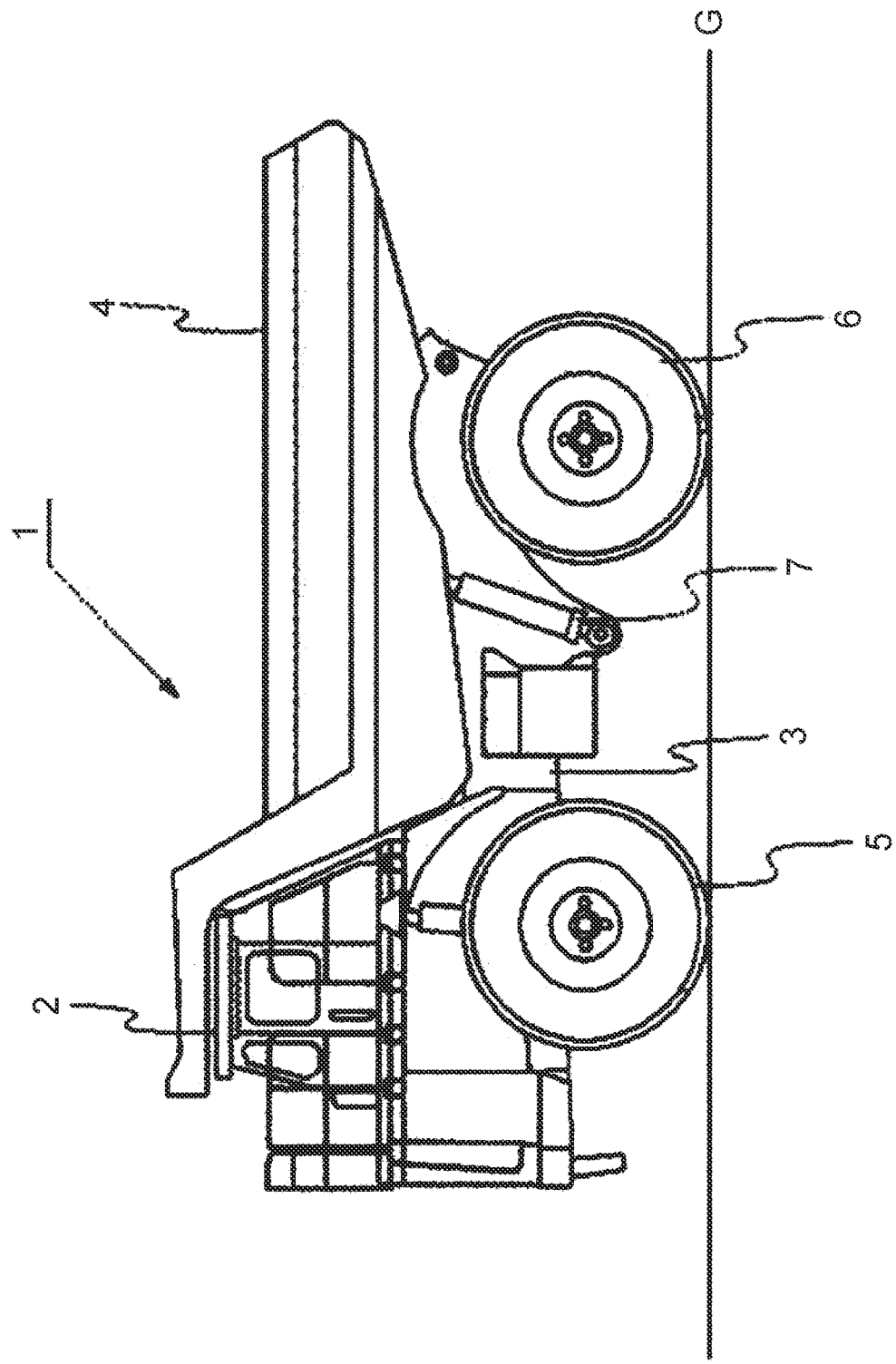
FIG. 2 is a left side view of a haulage vehicle.
Figure 3:
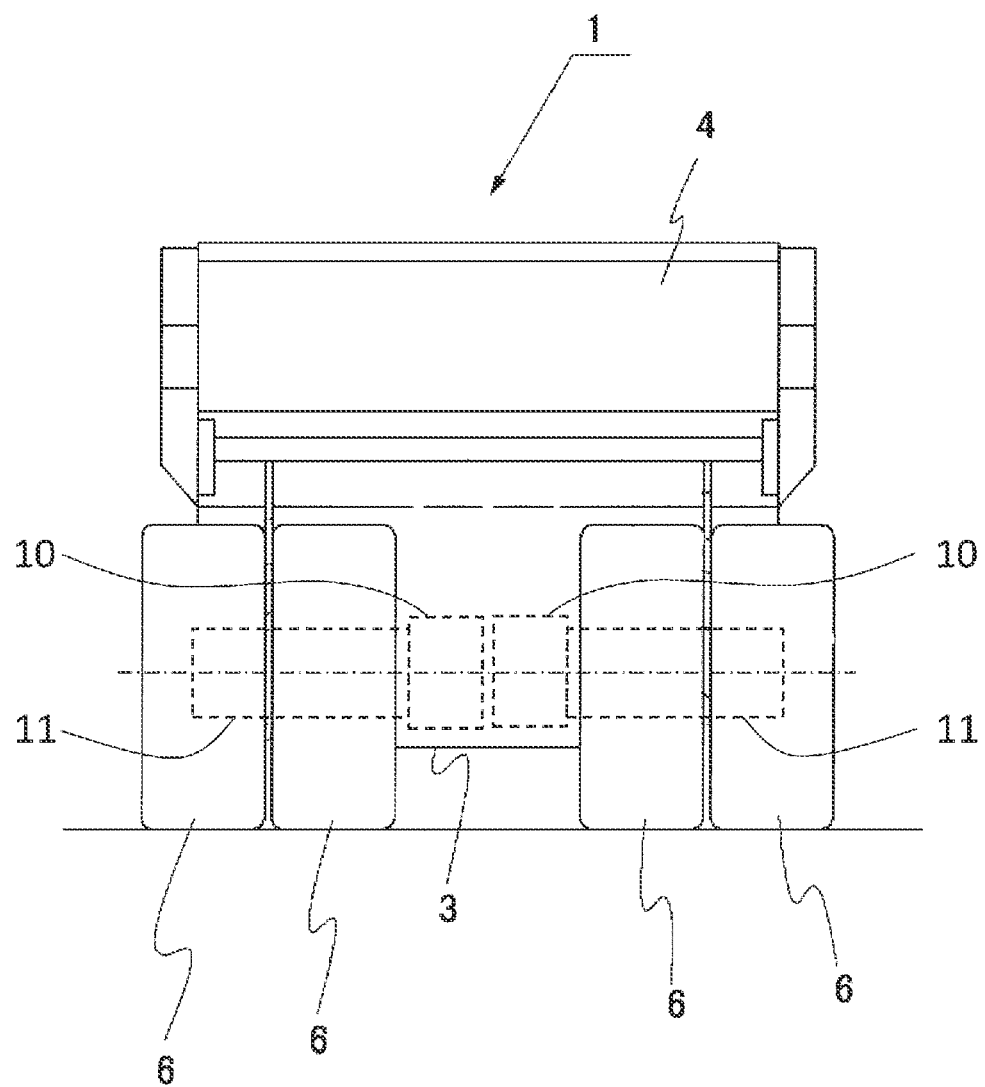
FIG. 3 is a rear view of the haulage vehicle.
Figure 4:
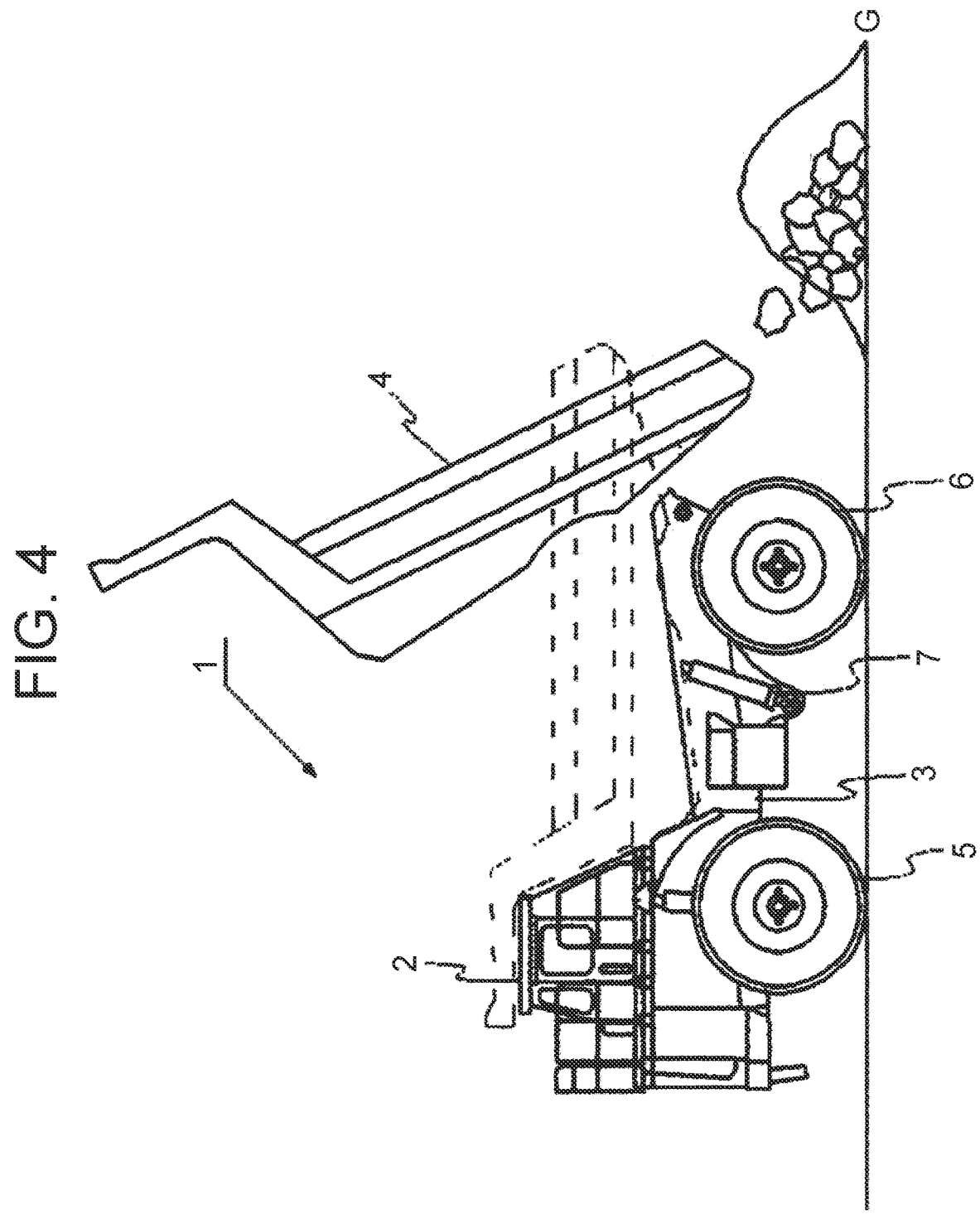
FIG. 4 is a left side view of the haulage vehicle in a dumping attitude.

FIG. 2 shows a left side view of the haulage vehicle 1, FIG. 3 shows a rear view of the haulage vehicle 1, and FIG. 4 shows a left side view of the haulage vehicle 1 in a dumping attitude. As shown in these drawings, the haulage vehicle 1 includes the cab 2, a vehicle frame 3, a vessel 4 that is mounted on the vehicle frame 3 so as to be capable of rising/falling, front wheels 5, rear wheels 6, and hoist cylinders 7.

The cab 2 is arranged for allowing an operator to get on and to operate the haulage vehicle 1, and is often disposed in the front left of the haulage vehicle 1.

The vehicle frame 3 configures a framework of the haulage vehicle 1, a pair of the front wheels 5 are arranged in the front of the vehicle frame 3, and a pair of the rear wheels 6 are arranged in the rear of the vehicle frame 3. The front wheels 5 and the rear wheels 6 are suspended by four suspension cylinders in the front, rear, left, and right which are not illustrated.

Inside the rear of the vehicle frame 3, at least one traveling electric motor 10 is arranged. The traveling electric motor 10 is connected to the rear wheels 6 through a reduction gear 11.

The rear wheels 6 are driven according to rotation of the traveling electric motor 10. The front wheels 5 are made to be steerable to the left and right by a steering cylinder not illustrated. Between the vehicle frame 3 and the vessel 4, the hoist cylinders 7 are attached. When the hoist cylinders 7 extend, the vessel 4 rises with respect to the vehicle frame 3 as shown in FIG. 4. When the hoist cylinders 7 retract, the vessel 4 is seated. At the time of dumping, by raising the vessel 4, the dirt and the like mounted on the vessel 4 are dumped to the rear of the haulage vehicle 1.

<Configuration of Travel Control Device 20 of Haulage Vehicle 1>

Figure 5:
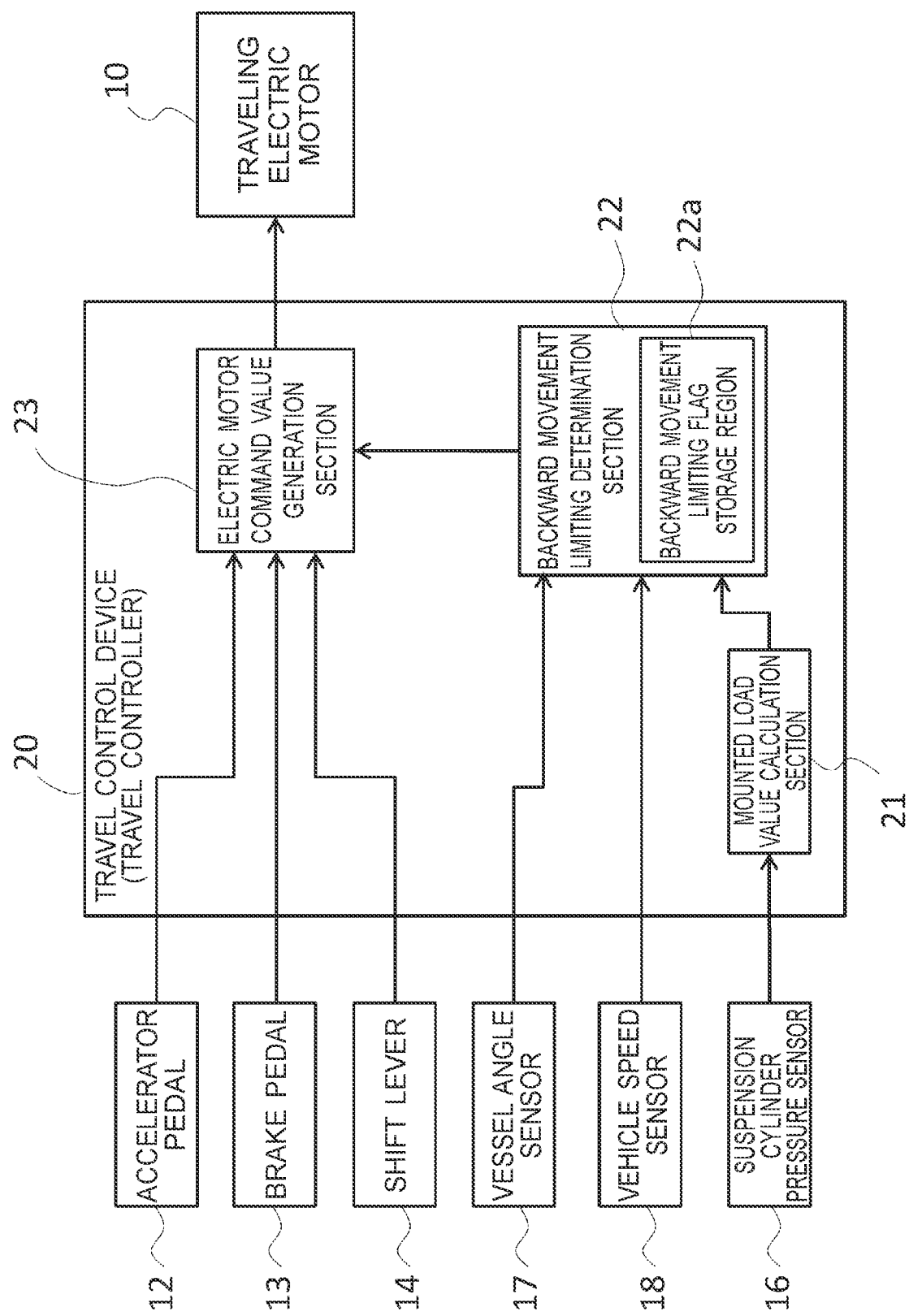
FIG. 5 is a block diagram that shows a configuration of a travel control device of the haulage vehicle.

FIG. 5 is a block diagram that shows a configuration of a travel control device 20 of the haulage vehicle 1 in the present embodiment. Inside the cab 2, the travel control device 20 is provided. To the travel control device 20, as an input system, an accelerator pedal 12, a brake pedal 13, and a shift lever 14 as operation devices are connected, the shift lever 14 switching the traveling direction forward or backward. Further, as an input system of the travel control device 20, a suspension cylinder pressure sensor 16, a vessel angle sensor 17, and a vehicle speed sensor 18 are connected.

As an output system of the travel control device 20, the traveling electric motor 10 is connected.

A command to the traveling electric motor 10 is effected by the accelerator pedal 12, the brake pedal 13, and the shift lever 14, and movement in the front-rear direction of the haulage vehicle 1 is instructed. Also, a command to the steering cylinder is effected by a steering wheel not illustrated provided inside the cabin 2, and steering of the front wheels 5 to the left and right is instructed.

The suspension cylinder pressure sensor 16 detects the pressure of the suspension cylinder.

The vessel angle sensor 17 detects the tilting angle of the vessel 4, and outputs an output value showing the tilting angle to the travel control device 20. Therefore, the vessel angle sensor 17 is equivalent to a tilting angle detector.

The vehicle speed sensor 18 is provided in the front wheel 5, and detects the vehicle speed of the haulage vehicle 1 from the rotational speed and the rotation direction of the front wheel 5.

The travel control device 20 includes a mounted load value calculation section 21, a backward movement limiting determination section 22, and an electric motor command value generation section 23.

The mounted load value calculation section 21 calculates the mounted load value of the haulage vehicle 1 from an output value of the suspension cylinder pressure sensor 16 (suspension cylinder pressure value). For the technology of calculating the mounted load value from the suspension cylinder pressure value, a technology generally and widely known may be used. Since the mounted load value calculation section 21 is provided in the travel control device 20, the travel control device 20 has a function as a load measurement device.

The backward movement limiting determination section 22 determines the backward movement limiting set value using an output value of the vessel angle sensor 17, an output value of the vehicle speed sensor 18, and a mounted load value calculated by the mounted load value calculation section 21. In the present embodiment, the value of a backward movement limiting flag is used as the backward movement limiting set value, the value "1" is explained as ON, and the value "0" is explained as OFF. Inside the backward movement limiting determination section 22, a backward movement limiting flag storage region 22a is provided. The process content in the backward movement limiting determination section 22 will be described below.

The electric motor command value generation section 23 calculates an electric motor command value using a command value of the accelerator pedal 12 (accelerator pedal command value), a command value of the brake pedal 13 (brake pedal command value), a command value of the shift lever 14 (forward position signal, backward position signal), and a value of the backward movement limiting flag stored in the backward movement limiting flag storage region 22a, and outputs the electric motor command value having been calculated to the traveling electric motor 10. The process content in the electric motor command value generation section 23 will be described below.

Figure 6:
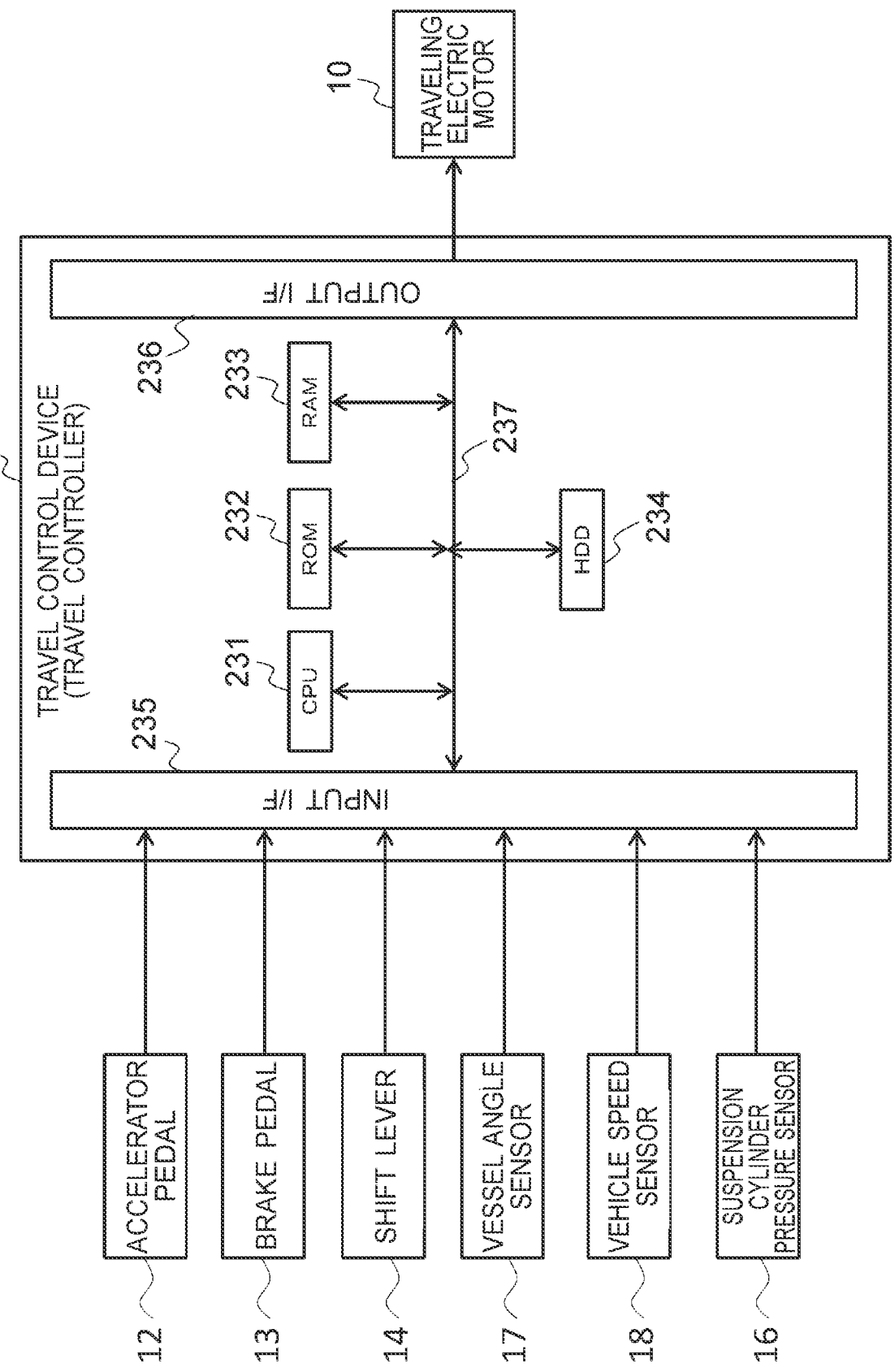
FIG. 6 is a hardware configuration diagram of the travel control device.

FIG. 6 is a hardware configuration diagram of the travel control device 20. The travel control device 20 is configured by a computer (travel controller) that includes a CPU 231 executing calculation, a ROM 232 storing various processes (programs), a RAM 233 storing a load measured value and a backward movement limiting flag, an HDD 234 as a storage device, an input interface 235 (input I/F) executing sensor inputting and communication, an output interface (output I/F) 236, and a bus 237 connecting these respective constituent elements to each other. The configuration of the computer described above is only an example, and the kind of the hardware such as a processor and a circuit is not limited.

<Process of Travel Control Device 20>

A process in each section of the travel control device 20 will be explained.

<Process of Backward Movement Limiting Determination Section 22>

Figure 7:
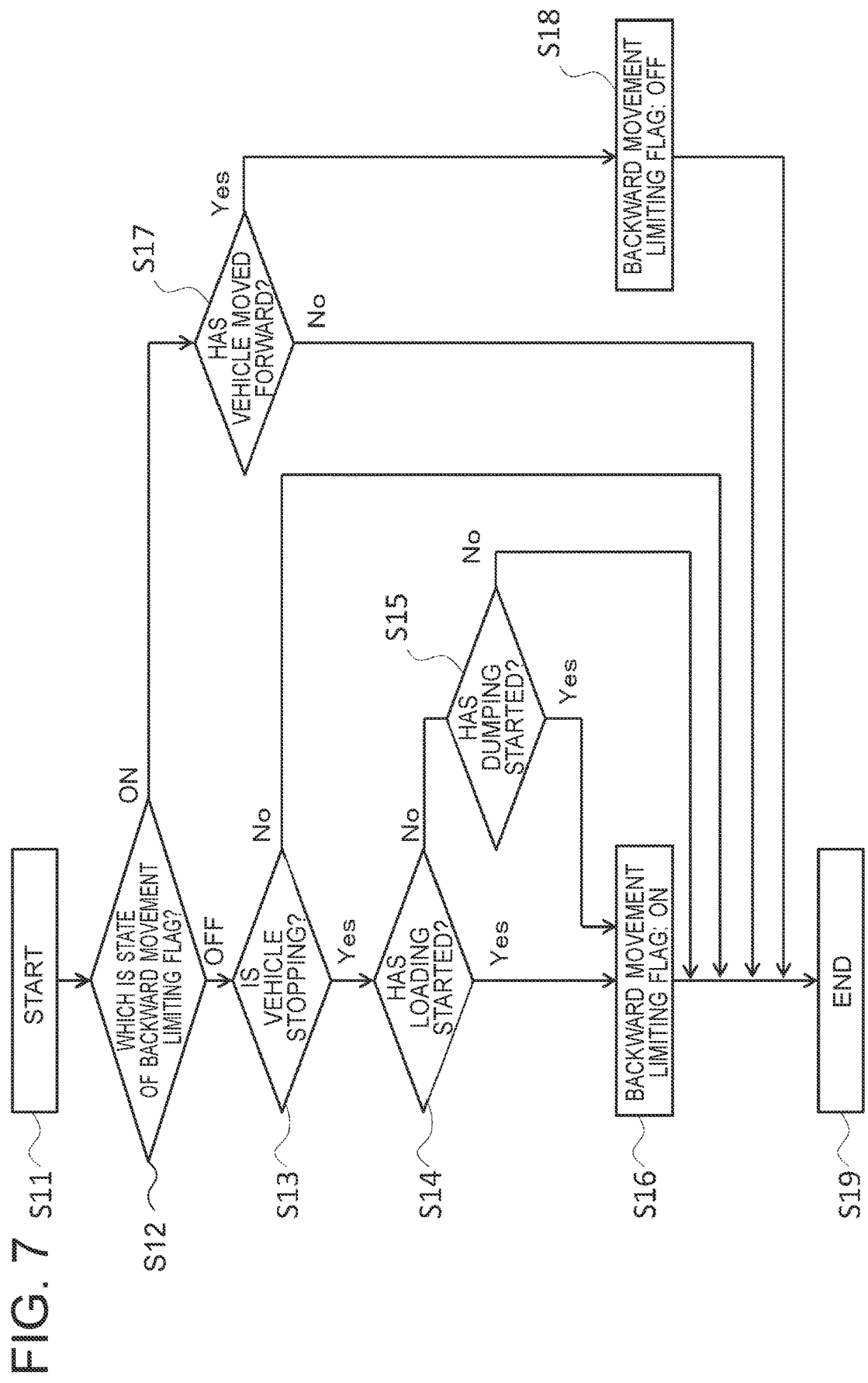
FIG. 7 is a process flowchart of a backward movement limiting determination section.

FIG. 7 is a process flowchart of the backward movement limiting determination section 22. The process of the backward movement limiting determination section 22 will be explained using FIG. 7. The process of the backward movement limiting determination section 22 is executed periodically.

When the process is started (S11), the backward movement limiting determination section 22 reads a present value of the backward movement limiting flag stored in the backward movement limiting flag storage region 22a (S12). The process proceeds to S13 when the backward movement limiting flag at present is "0 (OFF)" (S12/OFF), and the process proceeds to S17 when the backward movement limiting flag at present is "1 (ON)" (S12/ON).

The backward movement limiting determination section 22 determines whether or not the haulage vehicle 1 has been stopped based on the value of the vehicle speed sensor 18 (S13). When the haulage vehicle 1 has not stopped (S13/No), the process is ended (S19). When the haulage vehicle 1 has been stopped (S13/Yes), the process proceeds to S14.

The backward movement limiting determination section 22 determines whether or not the loading work to the haulage vehicle 1 has been started based on variation of the mounted load value (S14). When the mounted load value increases by a constant value or more from a value of the time of the empty load, the backward movement limiting determination section 22 determines that the loading work to the haulage vehicle 1 has been started (S14/Yes), sets the value of the backward movement limiting flag to "1 (ON)" (S16), and ends the process (S19).

On the other hand, when the mounted load value does not change from a value of the time of the empty load, the backward movement limiting determination section 22 determines that the loading work to the haulage vehicle 1 has not started yet (S14/No), and the process proceeds to S15.

The backward movement limiting determination section 22 determines whether or not the dumping work of the haulage vehicle 1 has been started based on an output value of the vessel angle sensor 17 (S15). When it is determined that the output value of the vessel angle sensor 17 has changed, the vessel 4 has risen, and the dumping work has been started (S15/Yes), the backward movement limiting determination section 22 sets the value of the backward movement limiting flag to "1 (ON)" (S16) and ends the process (S19).

When the value of the vessel angle sensor 17 does not change, the backward movement limiting determination section 22 determines that the dumping work has not started yet (S15/No) and ends the process (S19).

In S17, the backward movement limiting determination section 22 determines whether or not the haulage vehicle 1 is moving forward based on the value of the vehicle speed sensor 18. When it is determined that the haulage vehicle 1 is not moving forward (S17/No), the backward movement limiting determination section 22 ends the process (S19). When the haulage vehicle 1 has moved forward (S17/Yes), the backward movement limiting determination section 22 rewrites the value of the backward movement limiting flag to "0 (OFF)" (S18), and ends the process (S19).

By executing the process described above, when the haulage vehicle 1 starts the loading work or the dumping work, the value of the backward movement limiting flag becomes "1 (ON)". Also, when the haulage vehicle 1 moves forward in a state the value of the backward movement limiting flag is "1 (ON)", the value of the backward movement limiting flag becomes "0 (OFF)".

<Process of Electric Motor Command Value Generation Section 23>

Figure 8:
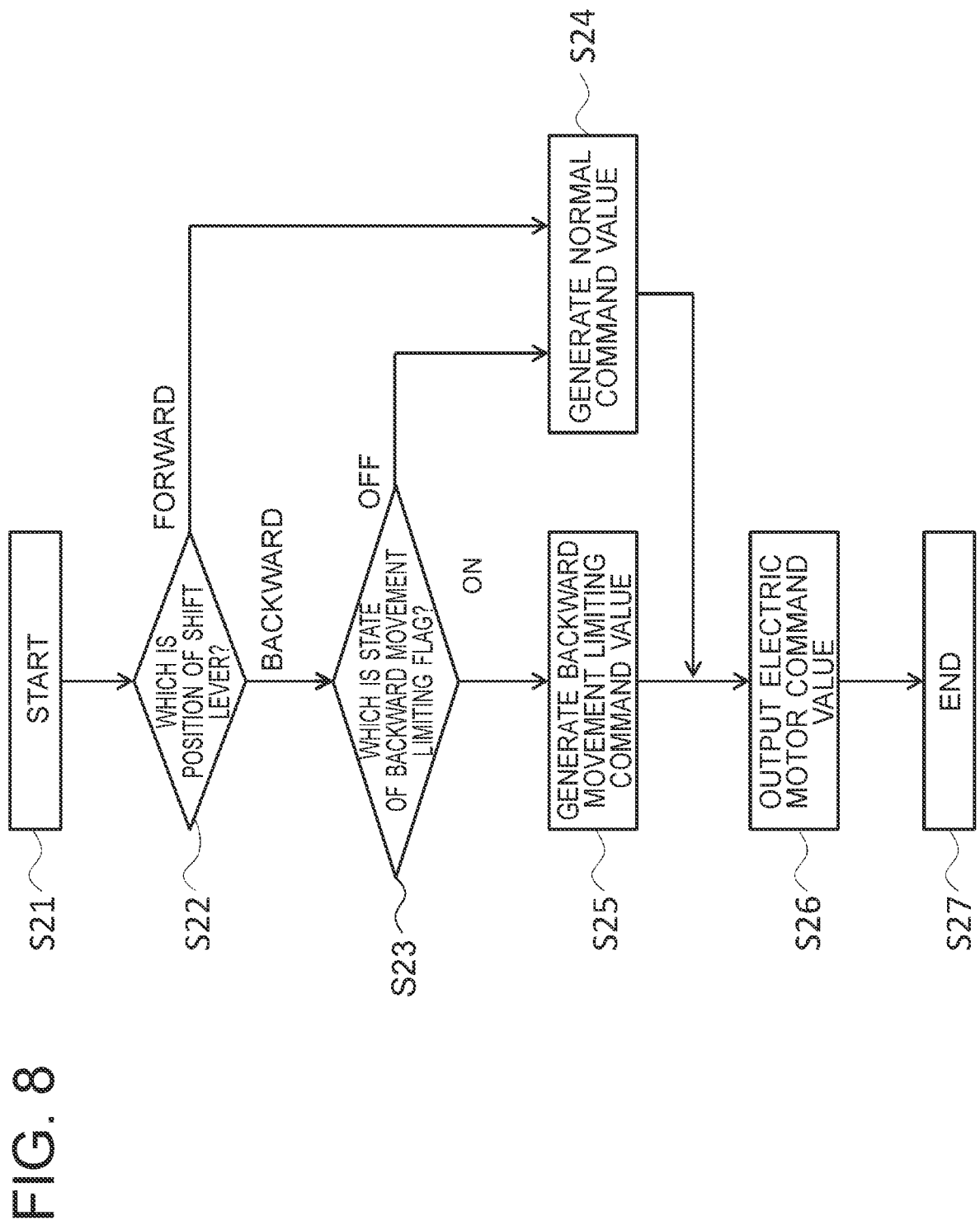
FIG. 8 is a process flowchart of an electric motor command value generation section.
Figure 9:
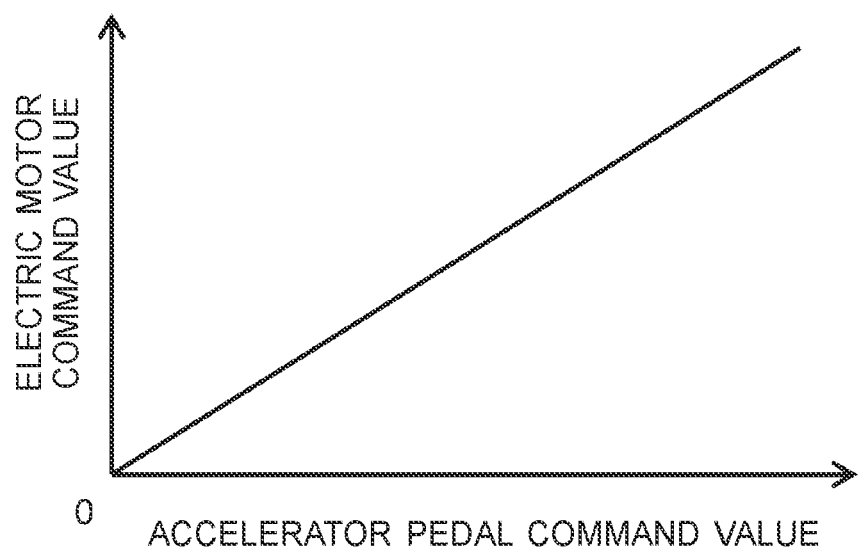
FIG. 9 is a schematic drawing that shows normal command value generation of the electric motor command value generation section.
Figure 10A:
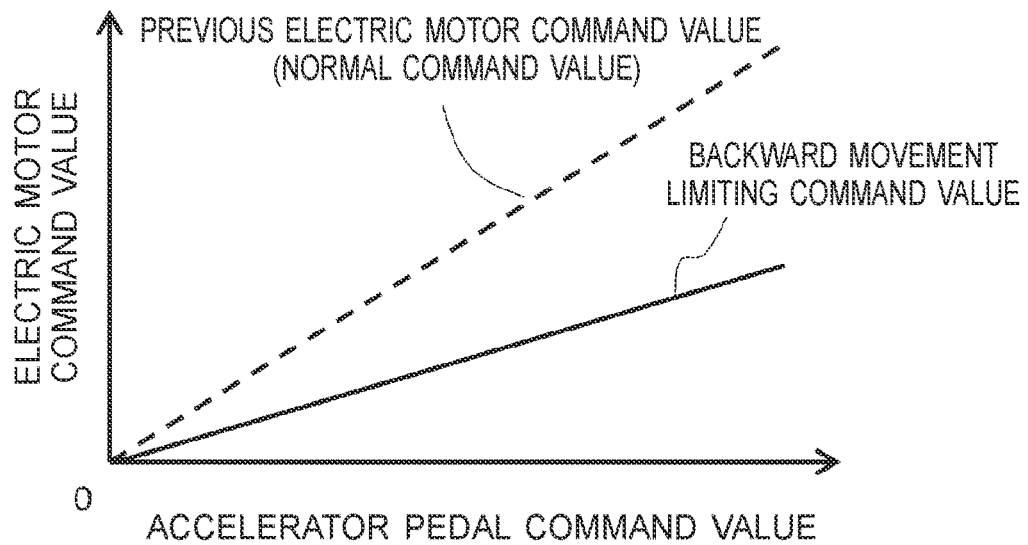
FIG. 10A is a schematic drawing that shows backward movement limiting command value generation of the electric motor command value generation section.
Figure 10B:
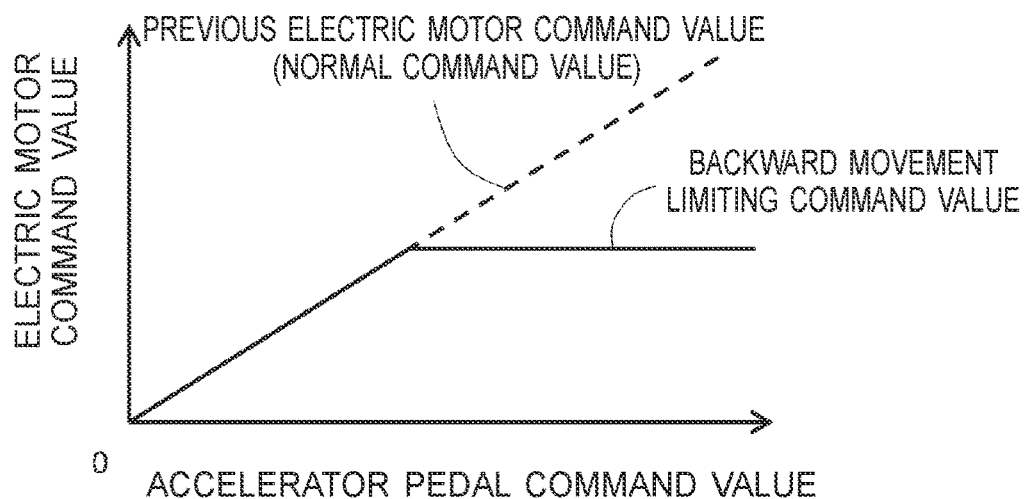
FIG. 10B is a schematic drawing that shows backward movement limiting command value generation of the electric motor command value generation section.

FIG. 8 shows a process flowchart of the electric motor command value generation section 23, FIG. 9 shows a schematic drawing showing normal command value generation of the electric motor command value generation section 23, and FIG. 10A and FIG. 10B show schematic drawings showing backward movement limiting command value generation of the electric motor command value generation section 23. A process of the electric motor command value generation section 23 will be explained using FIGS. 8, 9, 10A, 10B. The process of the electric motor command value generation section 23 is executed periodically.

When the process is started (S21), the electric motor command value generation section 23 confirms forward/backward of the shift lever 14 (S22). A forward position signal is outputted to the travel control device 20 when the shift lever 14 has been set to the forward position, and a backward position signal is outputted to the travel control device 20 when the shift lever 14 has been set to the backward position. The travel control device 20 determines the position of the shift lever 14 based on the forward position signal or the backward position signal. The process proceeds to S23 when the shift lever 14 is at the backward position (S22/backward), and the process proceeds to S24 when the shift lever 14 is at the forward position (S22/forward).

In S23, the electric motor command value generation section 23 confirms the value of the backward movement limiting flag. The process proceeds to S25 when the value of the backward movement limiting flag is "1 (ON)" (S23/ON), and the process proceeds to S24 when the value of the backward movement limiting flag is "0 (OFF)" (S23/OFF).

In S24, the electric motor command value generation section 23 generates an electric motor command value as per normal without particularly arranging limitation (normal command value based on an accelerator pedal command value acquired from the accelerator pedal 12 and a brake pedal command value acquired from the brake pedal 13, outputs an electric motor command value configured of the normal command value to the traveling electric motor 10 (S26), and ends the process (S27).

A method for calculating the electric motor command value from the accelerator pedal command value and the brake pedal command value is a technology generally and widely known. As an example, as shown in FIG. 9, there is a method of linearly increasing the electric motor command value according to the magnitude of the accelerator pedal command value. Here, the electric motor command value is a command value that drives the traveling electric motor 10, is a value that shows the rotational speed of a motor for example, but is not limited to this, and a torque command value, a speed command value, and the like may be selected freely.

In S25, the electric motor command value generation section 23 generates an electric motor command value (backward movement limiting command value) applying limitation to the accelerator pedal command value and the brake pedal command value (S25), outputs the electric motor command value configured of the backward movement limiting command value to the traveling electric motor 10 (S26), and ends the process (S27).

Although the method for applying limitation to a certain electric motor command value is a technology generally and widely known, three examples will be shown in the present embodiment. In the first example, as shown in FIG. 10A, a backward movement limiting command value obtained by multiplying a previous electric motor command value (a normal command value to which backward movement limitation is not applied) by a positive constant that is less than 1 is made to be a new electric motor command value. In the second example, as shown in FIG. 10B, an upper limit value is arranged with respect to a previous electric motor command value, and a backward movement limiting command value configured of the upper limit value is made to be a new electric motor command value with respect to the previous electric motor command value that is equal to or greater than the upper limit value. In the third example, the electric motor command value is made to be zero (travel is stopped) irrespective of the magnitude of the accelerator pedal command value, and backward movement is entirely prohibited. Using them, for example, the backward moving traveling speed is made to be a speed slower than a traveling speed by the previous electric motor command value or zero.

According to the present embodiment, backward movement motion of the haulage vehicle 1 when the value of the backward movement limiting flag is "1 (ON)" can be limited. Thus, after the loading or dumping work, the value of the backward movement limiting flag becomes "1 (ON)", and backward movement limitation is applied. Therefore, by applying limitation to backward movement of the haulage vehicle 1 only when the operator of the haulage vehicle 1 tries to make the haulage vehicle 1 move backward by carelessness after the loading or dumping work, impact caused by collision of the haulage vehicle 1 and an excavation bench or dumped dirt can be avoided or reduced without deteriorating operability. As a result, fracture damage of the haulage vehicle 1 can be reduced.

Also, compared to dumping work recognition by the mounted load, the dumping work can be recognized based on inclination of the vessel 4 before the haulage vehicle 1 actually dumps the dirt, and backward movement limitation of the haulage vehicle 1 can be executed at quicker and more suitable timing.

Further, it is allowed to recognize normal forward movement of the haulage vehicle 1 after the loading or dumping work and to release backward movement limitation, and application of backward movement limitation at unnecessary timing can be prevented.

The present invention is not limited to the embodiment described above, and various alterations and amendments by a person with an ordinary skill in the art are possible within the range of the technical thought disclosed in the present specification. Modifications will be described below.

<Determination of Dumping by Mounted Load Value>

According to the present embodiment, the backward movement limiting determination section 22 determines that the haulage vehicle 1 has started the dumping work based on variation of the output value of the vessel angle sensor 17. However, it is also possible to detect reduction of the mounted load within the vessel 4 based on variation of the mounted load value, and to determine that the haulage vehicle 1 has started the dumping work.

<Determination of Forward Movement by Shift Lever 14+Accelerator Pedal 12>

According to the present embodiment, the backward movement limiting determination section 22 determines whether or not the haulage vehicle 1 is moving forward based on the output value of the vehicle speed sensor 18. However, it is also possible to determine forward movement of the haulage vehicle 1 based on the shift lever command value and the accelerator pedal command value. In concrete terms, the haulage vehicle 1 is determined to have moved forward when the accelerator pedal 12 is stepped down and the accelerator pedal command value is outputted to the travel control device 20 in a state "forward" is selected in the shift lever 14.

<Backward Movement Limitation by Rising of Vessel 4>

According to the present embodiment, the backward movement limiting determination section 22 determines presence/absence of the dumping work based on rising of the vessel 4 and decides to execute backward movement limitation. However, it is also possible to determine execution of backward movement limitation using tilting itself of the vessel 4 as a reference.

Although a dump truck for a mine was exemplified as the haulage vehicle 1 in the present embodiment described above, the present invention can be applied also to a working machine such as a wheel loader including a bucket of a front working device and loading the dirt and a water tank truck that stores water in a tank provided in the vehicle. In this case, the present invention can also be applied executing determination only with respect to the loading work without determination with respect to the dumping work. Furthermore, the present invention can be applied also to a transportation vehicle used in a general construction site and the like not for a mine.

REFERENCE SIGNS LIST

1: Haulage vehicle
2: Cab
3: Vehicle frame
4: Vessel
5: Front wheel
6: Rear wheel
7: Hoist cylinder
10: Traveling electric motor 11: Reduction gear
12: Accelerator pedal
13: Brake pedal
14: Shift lever
16: Suspension cylinder pressure sensor
17: Vessel angle sensor
18: Vehicle speed sensor
20: Travel control device
21: Mounted load value calculation section
21a: Backward movement limiting flag storage region
22: Backward movement limiting determination section
23: Electric motor command value generation section

The invention claimed is:

1. A haulage vehicle, comprising:
a vehicle frame;
a body that mounts a load, wherein the body is a vessel arranged on the vehicle frame so as to be capable of rising/falling;
a load measurement device that measures a mounted load value of the body;
at least one traveling electric motor;
a shift lever that shifts the travel direction forward or backward;
an accelerator pedal;
a vehicle speed sensor;
a vessel angle sensor; and
a travel control device that outputs an electric motor command value to the traveling electric motor,
wherein the travel control device is connected to each of the load measurement device, the traveling electric motor, the shift lever, the vehicle speed sensor, the vessel angle sensor, and the accelerator pedal, and
the travel control device is configured to:
determine whether the haulage vehicle has started a loading work based on variation of the mounted load value calculated by the load measurement device, and when determining that the haulage vehicle has started the loading work, set a backward movement limiting set value that limits backward traveling of the haulage vehicle to ON;
determine whether the haulage vehicle has started a dumping work based on an output value of the vessel angle sensor, and when determining that the haulage vehicle has started the dumping work, also set the backward movement limiting set value that limits the backward traveling of the haulage vehicle to ON;
determine that the haulage vehicle has moved forward when a forward position signal and an accelerator pedal command value are inputted, and the backward movement limiting set value is set to OFF, the forward position signal showing that the shift lever is set to a forward position and the accelerator pedal command value being generated accompanying stepping down of the accelerator pedal;
output an electric motor command value formed of a backward movement limiting command value that limits backward movement of the haulage vehicle to the traveling electric motor when the backward movement limiting set value is ON so as to make a backward movement traveling speed slower than a traveling speed set by a normal command value not limiting the backward movement or zero; and
output an electric motor command value formed of the normal command value not limiting the backward movement to the traveling electric motor when the backward movement limiting set value is OFF.

2. The haulage vehicle according to claim 1, wherein
the travel control device is configured to determine whether the haulage vehicle has moved forward based on an output value from the vehicle speed sensor, and
the travel control device is configured to set the backward movement limiting set value to OFF when it is determined that the haulage vehicle has moved forward.

3. The haulage vehicle according to claim 1,
wherein the backward movement limiting set value is any one of a command value that limits a backward traveling speed, a command value that limits driving torque allowing backward traveling, and a command value that completely stops backward traveling.

4. The haulage vehicle according to claim 1,
wherein the travel control device includes a backward movement limiting flag storage region that stores a backward movement limiting flag showing the backward movement limiting set value, and the travel control device is configured to set the backward movement limiting set value to ON or OFF by rewriting a value of the backward movement limiting flag.

* * * * *